US006959109B2

(12) United States Patent
Moustafa

(10) Patent No.: US 6,959,109 B2
(45) Date of Patent: Oct. 25, 2005

(54) SYSTEM AND METHOD FOR POSE-ANGLE ESTIMATION

(75) Inventor: Mohamed Nabil Moustafa, Bayonne, NJ (US)

(73) Assignee: Identix Incorporated, Minnetonka, MN (US)

( * ) Notice: Subject to any disclaimer, the term of this patent is extended or adjusted under 35 U.S.C. 154(b) by 54 days.

(21) Appl. No.: 10/175,929

(22) Filed: Jun. 20, 2002

(65) Prior Publication Data

US 2003/0235332 A1 Dec. 25, 2003

(51) Int. Cl.[7] .............................. G06K 9/00; G06K 9/62; G06E 1/00
(52) U.S. Cl. ...................... 382/159; 382/117; 340/5.53; 706/20
(58) Field of Search ................................. 382/115, 117, 382/118, 156–160, 282, 298, 253, 216; 340/5.53, 5.8–5.83, 553; 706/15, 20, 25

(56) References Cited

U.S. PATENT DOCUMENTS

| | | | | |
|---|---|---|---|---|
| 5,239,594 A | * | 8/1993 | Yoda ........................... | 382/158 |
| 5,642,431 A | | 6/1997 | Poggio et al. .............. | 382/118 |
| 5,850,470 A | * | 12/1998 | Kung et al. ................. | 382/157 |
| 6,128,397 A | | 10/2000 | Baluja et al. | |
| 6,144,755 A | | 11/2000 | Niyogi et al. | |
| 6,429,699 B1 | * | 8/2002 | Shi et al. .................... | 327/103 |

OTHER PUBLICATIONS

Kohonen et al., "Engineering Applications of the Self–Organizing Map," IEEE 1996, pp. 1358–1384.*
Amari, "Training Error, Generalization Error and Learning Curves in Neural Learning," IEEE 1995, pp. 4–5.*
Rowley et al., "Rotation Invariant Neural Network–Based Face Detection," IEEE 1998, pp. 1–7.*
Lawrence et al., "Convolution Neural Networks for Face Recognition," IEEE 1996, pp. 217–222.*
Rowley et al., "Rotation Invariant Neural Network–Based Face Detection," Proceedings of IEEE Conference on Computer Vision and Pattern Recognition, pp. 1–7 (Jun. 1998).
Li et al., "Support Vector Regression and Classification Based Multi–view Face Detection and Recognition," *Proceedings IEEE International Conference on Automatic Face and Gesture Recognition*, Mar. 2000.
Yan et al., "Ensemble SVM Regression Based Multi–View Face Detection System," Microsoft Research Technical Report MSR–TR–2001–09, Jan. 18, 2001.
Shimizu et al., "Head Pose Determination from One Image Using a Generic Model," *Proceedings IEEE International Conference on Automatic Face and Gesture Recognition*, Apr. 1998.
Kohonen, "Self–Organizing Maps," ISBN 3–540–62017–6, Springer–Verlag 2$^{nd}$ ed., 1997 (Title page, table of contents and index only).

* cited by examiner

*Primary Examiner*—Mehrdad Dastouri
(74) *Attorney, Agent, or Firm*—Beyer Weaver & Thomas, LLP

(57) ABSTRACT

A system and method are disclosed for determining the pose angle of an object in an input image. In a preferred embodiment, the present system comprises a pose estimator having a prototype projector, a regression estimator, and an angle calculator. The prototype projector is preferably adapted to reduce the input image dimensionality for faster further processing by projecting the input pixels of the image onto a Self-Organizing Map (SOM) neural network. The regression estimator is preferably implemented as a neural network and adapted to map the projections to a pattern unique to each pose. The angle calculator preferably includes a curve fitter and an error analyzer. The curve fitter is preferably adapted to estimate the pose angle from the mapping pattern. The error analyzer is preferably adapted to produce a confidence signal representing the likelihood of the input image being a face at the calculated pose. The system also preferably includes two network trainers responsible for synthesizing the neural networks.

49 Claims, 7 Drawing Sheets

SYSTEM AND METHOD FOR POSE-ANGLE ESTIMATION

FIELD OF THE INVENTION

The present invention relates to the field of image analysis.

BACKGROUND OF THE INVENTION

Head pose is an important visual cue that enhances the ability of vision systems to process facial images. Head pose includes three angular components: yaw, pitch, and roll.

Yaw refers to the angle at which a head is turned to the right or left about a vertical axis. Pitch refers to the angle at which a head is pointed up or down about a lateral axis. Roll refers to the angle at which a head is tilted to the right or left about an axis perpendicular to the frontal plane.

Yaw and pitch are referred to as out-of-plane rotations because the direction in which the face points changes with respect to the frontal plane. By contrast, roll is referred to as an in-plane rotation because the direction in which the face points does not change with respect to the frontal plane.

Estimating head pose from photographs, video sequences, and other images is a highly complex task since it implicitly requires finding a face at an arbitrary pose angle. Several approaches for estimating head pose have been developed. These fall into two principal categories: model-based techniques and appearance-based techniques.

Model-based techniques typically recover an individual's 3-D head shape from an image and then use a 3-D model to estimate the head's orientation. An exemplary model-based system is disclosed in "Head Pose Estimation from One Image Using a Generic Model," *Proceedings IEEE International Conference on Automatic Face and Gesture Recognition*, 1998, by Shimizu et al., which is hereby incorporated by reference. In the disclosed system, edge curves (e.g., the contours of eyes, lips, and eyebrows) are first defined for the 3-D model. Next, an input image is searched for curves corresponding to those defined in the model. After establishing a correspondence between the edge curves in the model and the input image, the head pose is estimated by iteratively adjusting the 3-D model through a variety of pose angles and determining the adjustment that exhibits the closest curve fit to the input image. The pose angle that exhibits the closest curve fit is determined to be the pose angle of the input image.

But such model-based approaches suffer from several drawbacks. First, the computational complexity of model-based approaches is very high and beyond the capabilities of many personal computers.

Second, a single 3-D generic face model does not account for variations in head shape or facial expression. Thus, such models yield poor performance when applied to a wide variety of faces.

Third, model-based system performance is typically proportional to input image resolution and requires image resolutions on the order of 128 by 128 pixels for satisfactory performance. As the input-image resolution decreases, performance degrades.

In contrast to model-based techniques, appearance-based techniques typically compare a two-dimensional subject with a set of two-dimensional model images. A distance metric is used to determine the distance between the subject image and each of the model images. The closest model image is used to determine the pose angle of the subject image.

But appearance-based techniques also suffer from significant drawbacks. In particular, the computational complexity of appearance-based methods depends on the number of model images used. If a large number of model images are used, then the system may not be able to perform the comparison in real time.

One appearance-based system that attempts to address this problem is disclosed in U.S. Pat. No. 6,144,755 to Niyogi et al., which is hereby incorporated by reference. Niyogi employs a tree-structured vector quantization technique to organize a training set of facial images. Each of the images in the training set is stored as a leaf of the tree. When an input image is received, the tree is traversed to determine the closest image in the training set. The pose angle of the closest image is output as the pose angle of the input image.

One disadvantage of this system, however, is that it requires a large number of training images to be stored in memory throughout system operation. The storage requirements for these training images may exceed the amount of high-speed random-access memory found in many modem personal computers.

Furthermore, the output pose angles in this system are restricted to the available pose-angle values of the training-set images. Thus, this system will not exhibit adequate accuracy, within 5 to 10 degrees for many applications, unless a very large set of training images is stored.

Another appearance-based pose-angle estimation method is disclosed in "Support Vector Regression and Classification Based Multi-view Face Detection and Recognition," *Proceedings IEEE International Conference on Automatic Face and Gesture Recognition*, 2000, by Li et al., which is hereby incorporated by reference. In this technique, Principal Component Analysis (PCA) is first used to reduce the dimensionality of the input image. Then, a Support Vector Regression (SVR) module trained a priori estimates the head-pose angle.

But the estimation accuracy of this technique depends on the number of support vectors (SVs) employed, which can be a large portion of the training-set images. For instance, a 10,000-image training set requires, in this method, at least 1,500 SVs. Therefore, the SVR module requires a large memory to estimate pose with an acceptable margin of error. Moreover, the large number of SVs inflates the computation time required, making real-time implementation difficult.

Another appearance-based pose-angle estimation method is described in "Ensemble SVM Regression Based Multi-View Face Detection System," Microsoft Technical Report MSR-TR-2001-09, Jan. 18, 2001, by Yan et al., which is hereby incorporated by reference. This system uses wavelet transforms to extract frontal, half-profile, and profile features of an input image and produces an image for each feature. Next, the feature images are provided to three support-vector classifiers. The output of these classifiers is provided to an ensemble SVR module that yields a pose angle. But since this system uses a support vector technique, it suffers from the same problems as the Li system above and cannot be easily implemented as a real-time system.

Therefore, a need remains for a rapid, robust, and cost-effective method to determine head pose. Such a system should preferably have low processing and memory requirements even when operating in real time.

SUMMARY OF THE INVENTION

A system and method are disclosed for determining the pose angle of an object in an input image. In a preferred embodiment, the present system comprises a pose estimator that includes a prototype projector, a regression estimator, and an angle calculator.

The prototype projector reduces the input image dimensionality by projecting the input image onto a Self-Organizing Map (SOM) neural network. The resulting projections are preferably provided to the regression estimator which maps them to a pattern that uniquely corresponds to the object's pose angle.

The angle calculator preferably comprises a curve fitter and an error analyzer. The curve fitter estimates the pose angle from the mapping pattern. The error analyzer produces a confidence signal representing the likelihood that the input image is a face at the calculated pose angle.

In a preferred embodiment, the SOM neural network is synthesized by a first network trainer in an unsupervised mode using a set of training images. The training preferably produces a plurality of object prototypes corresponding to different poses in the training images.

In a preferred embodiment, the regression estimator is implemented as a neural network synthesized by a second network trainer in a supervised mode using a set of training images with known pose angles. The regression estimator is preferably trained using an error back-propagation technique, in which the regression estimator is supplied with both projection vectors generated by the SOM neural network from the training images and desired output for the regression estimator calculated using the known pose angles.

In a preferred embodiment, the present system and method may exist independently or be integrated with one or more object detection and/or recognition systems.

In one aspect, the present invention is directed to a system for determining the pose angle of an object, comprising a prototype projector adapted to receive an input image and generate a projection vector, a regression estimator adapted to receive the projection vector and output a mapping vector, and a pose-angle calculator adapted to receive the mapping vector and output an estimated pose angle.

In another aspect of the present invention, the object is a head.

In another aspect of the present invention, the system further comprises a face-confidence calculator adapted to receive the mapping vector and the estimated pose angle and to calculate a face-confidence value.

In another aspect of the present invention, the prototype projector comprises a first neural network and a projector.

In another aspect of the present invention, the first neural network is a SOM neural network comprising a plurality of object prototypes representative of object appearance in all possible pose angles.

In another aspect of the present invention, the set of object prototypes is generated during a one-time network synthesis using a set of training images.

In another aspect of the present invention, the projecting is performed by calculating a Euclidean-based distance metric between the input image and the set of object prototypes.

In another aspect of the present invention, the regression estimator comprises a second neural network.

In another aspect of the present invention, the second neural network is a regression network comprising a plurality of input nodes and output nodes.

In another aspect of the present invention, the regression estimator is trained by projecting training images onto a first neural network and training the regression estimator to associate resulting image projections with calculated output patterns unique to input pose angle.

In another aspect of the present invention, the angle calculator comprises a curve fitter.

In another aspect of the present invention, the angle calculator comprises an error analyzer.

In another aspect, the present invention is directed to a method for determining the pose angle of an object, comprising run-time operation that includes projecting an object input image onto the set of prototypes to obtain input image projections, applying the input projections to trained regression network to obtain a mapping pattern and, estimating the object pose angle from the mapping pattern and producing an output signal indicative of estimation confidence.

In another aspect of the present invention, the object is a head.

In another aspect, the method further comprising one-time synthesis that includes generating a set of prototypes representative of the object appearance in all possible pose angles from a set of training images, projecting training input images onto the set of prototypes to obtain a plurality of projection metrics and, training a regression network to associate input projection with output pattern unique to input pose angle.

In another aspect, the present invention is directed to a system for determining the pose angle of an object in an input image in at least one dimension, comprising a first neural network trained in an unsupervised mode using a first plurality of training images to develop a plurality of weight vectors, each weight vector representing a plurality of the training images, a projector adapted to receive an input image and generate a projection vector comprising a plurality of calculated distances representing distances between the input image and the weight vectors, a second neural network trained in a supervised mode with a second plurality of training images, the second plurality of training images comprising objects at known pose angles, the second neural network comprising a plurality of neurons, each neuron tuned to a particular pose angle and adapted to receive the projection vector and output a value in accordance with a function that is even and monotonically decreasing for changes in the pose angle of the object from the pose angle to which each neuron is tuned, a curve fitter adapted to receive the values output by the neurons and estimate the pose angle of the object in at least one dimension and, an error calculator that generates a value representative of the error between the values output by the neurons and the calculated values for the function using the estimated pose angle.

In another aspect of the present invention, the error value is used to detect the presence of an object.

In another aspect of the present invention, the object is a face.

In another aspect, the present invention is directed to a method for determining the pose angle of an object in an input image in at least one dimension, comprising training a first neural network in an unsupervised mode using a first plurality of training images to develop a plurality of weight vectors, each weight vector representing a plurality of the training images, projecting the input image onto the first neural network to generate a projection vector comprising a plurality of calculated distances representing distances between the input image and the weight vectors, training a second neural network in a supervised mode with a second plurality of training images, the second plurality of training images comprising objects at known pose angles, the second neural network comprising a plurality of neurons, each neuron tuned to a particular pose angle, processing the projection vector in the second neural network in accordance with a function that is even and monotonically decreasing for changes in the pose angle of the object from the pose angle to which each neuron is tuned to generate a plurality of output values, fitting the output values to a curve to estimate the pose angle of the object in at least one dimension and, calculating a value representative of the error between the output values and calculated values for the function using the estimated pose angle.

In another aspect of the present invention, the error value is used to detect the presence of an object.

In another aspect of the present invention, the object is a face.

BRIEF DESCRIPTION OF THE DRAWINGS

The above summary of the invention will be better understood when considered in conjunction with the following detailed description and accompanying drawings, in which.

DETAILED DESCRIPTION OF THE PREFERRED EMBODIMENTS

I. System Architecture

Figure 1:
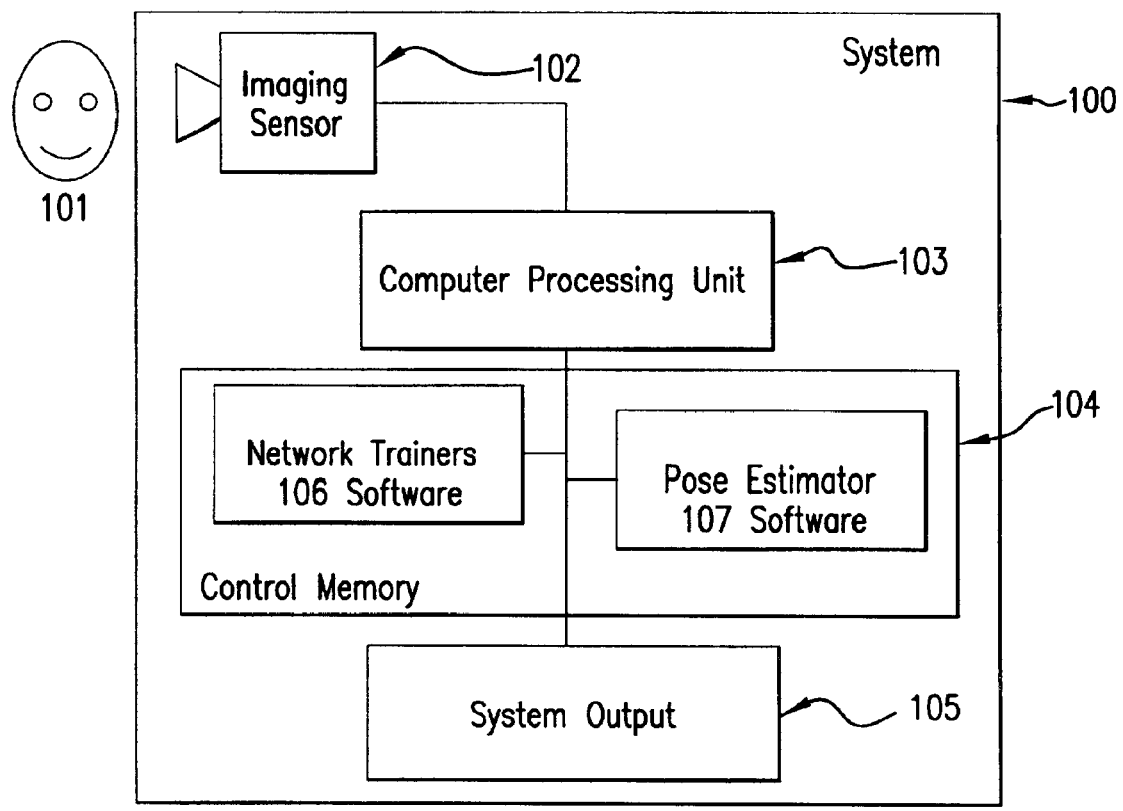
FIG. 1 shows a preferred embodiment of a system for pose-angle estimation.

FIG. 1 shows a preferred embodiment of a system 100 suitable for estimating the pose angle of an object in an input image. For purposes of illustration, operation of system 100 will be primarily described in connection with estimating the pose angle of a particular class of objects, i.e., human heads. It should be recognized, however, that the present system and method may be more broadly applied to other objects, as described below.

In addition, for purposes of illustration, operation of system 100 will be primarily described in connection with estimating the pose angle of a human head in one dimension, i.e., yaw. It should be recognized, however, that the present system and method may be more broadly applied to calculate pose angle in one or more dimensions, as described, for example, in connection with FIGS. 6–8 below.

In the following description, a particular convention is adopted to describe the pose angle of a human head in the yaw, pitch, and roll dimensions. As those skilled in the art will recognize, however, the present system and method may be implemented using any suitable convention for describing pose angle. The convention adopted herein is:

yaw: 0° when the face is frontal;
    positive (1° to 90°) when the subject rotates his or her head to the left;
    negative (−1° to −90°) when the subject rotates his or her head to the right.
pitch: 0° when the face is frontal;
    positive (1° to 90°) when the subject rotates his or her head upward;
    negative (−1° to −90°) when the subject rotates his or her head downward.
roll: 0° when the head is not tilted;
    positive (1° to 90°) when the subject tilts his or her head to the left;
    negative (−1° to −90°) when the subject tilts his or her head to the right.

Turning now to FIG. 1, system 100 preferably comprises an imaging sensor 102, a processor 103, a control memory 104, and a system output 105. In a preferred embodiment, processor 103 may comprise a general-purpose microprocessor such as those found in personal computers. Alternatively, processor 103 may comprise a digital signal processor (DSP) or an application specific integrated circuit (ASIC). Memory 104 may comprise any suitable storage medium or combination of media including, without limitation, a magnetic or optical disc or other suitable storage means.

Imaging sensor 102 may comprise any suitable means for obtaining a digital signal representing a physical object such as a video camera or digital camera. Furthermore, imaging sensor 102 maybe adapted to capture images from any suitable source such as live subjects, photographs, printed images, or artists' renderings.

Control memory 104 preferably stores computer data and instructions used by processor 103 to implement two neural network trainers 106 and a pose estimator 107, as described below. It should be recognized that pose estimator 107 and network trainers 106 may alternatively be implemented in other ways, such as by use of dedicated electronic circuitry or other suitable combinations of hardware and software.

Before describing pose estimator 107 in more detail, a brief discussion of system operation is first provided. During operation, imaging sensor 102 captures an image of an object 101, such as a human face. Imaging sensor 102 forwards the image to pose estimator 107 which determines the pose angle of the face relative to some axis such as a vertical axis in the field of view of imaging sensor 102. Pose estimator 107 also preferably calculates a confidence level that reflects, in this preferred embodiment, the likelihood that the input image represents a human face at the determined pose angle. The face confidence is preferably a numeric value (0 to 100) that yields a score in percent probability that the input image is a face at the calculated pose angle.

System output 105 may be displayed for informational purposes. In most cases, however, system output 105 is also or alternatively supplied to another operating module, such as a pose compensation system adapted to recover a frontal image of the face from the input image.

Figure 2:
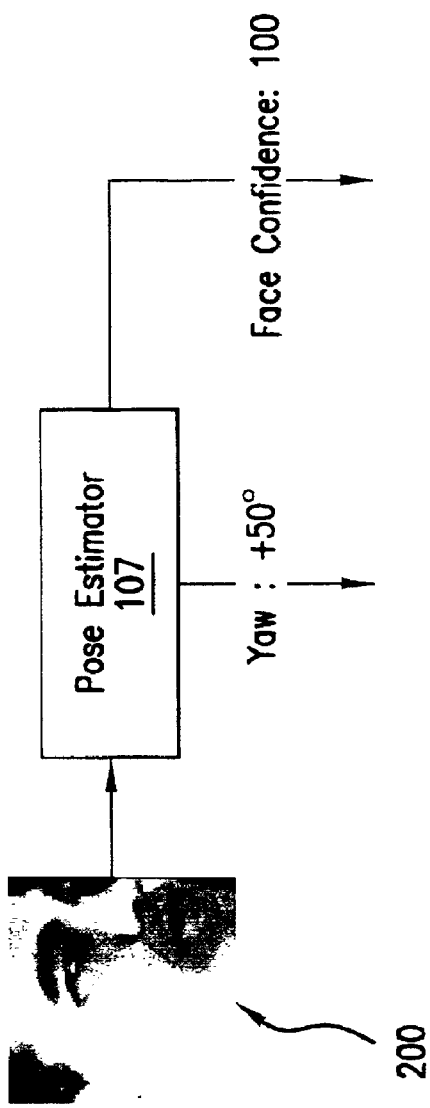
FIG. 2 shows a preferred embodiment of the output of a pose estimator supplied with an input image that contains a face in half-profile.

FIG. 2 shows a preferred embodiment of the output of pose estimator 107 for an input image containing a half-profile face 200. As shown in FIG. 2, the output of pose estimator 107 preferably comprises two components: a measure of the face's yaw and a measure of the face confidence. A high face confidence value (as shown, e.g., in FIG. 2) supports the conclusion that there is a face at the determined output pose angle in the subject image.

Figure 3:
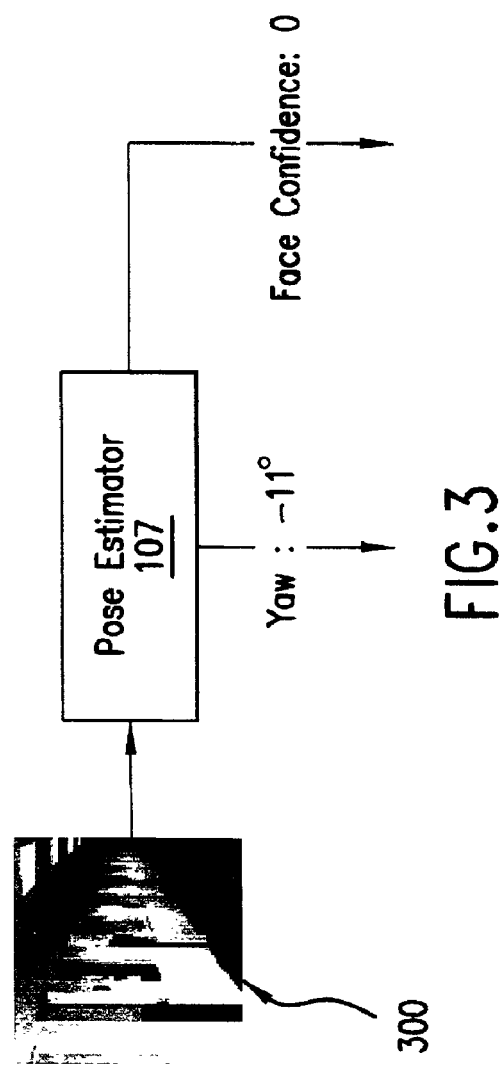
FIG. 3 shows a preferred embodiment of the output of a pose estimator supplied with an input image that does not include a face.

By contrast, FIG. 3 shows a preferred embodiment of the output of pose estimator 107 for an input image 300 that does not contain a face. The low face-confidence value supports the conclusion that input image 300 does not contain a face and weakens reliance on the output pose angle.

Figure 4:
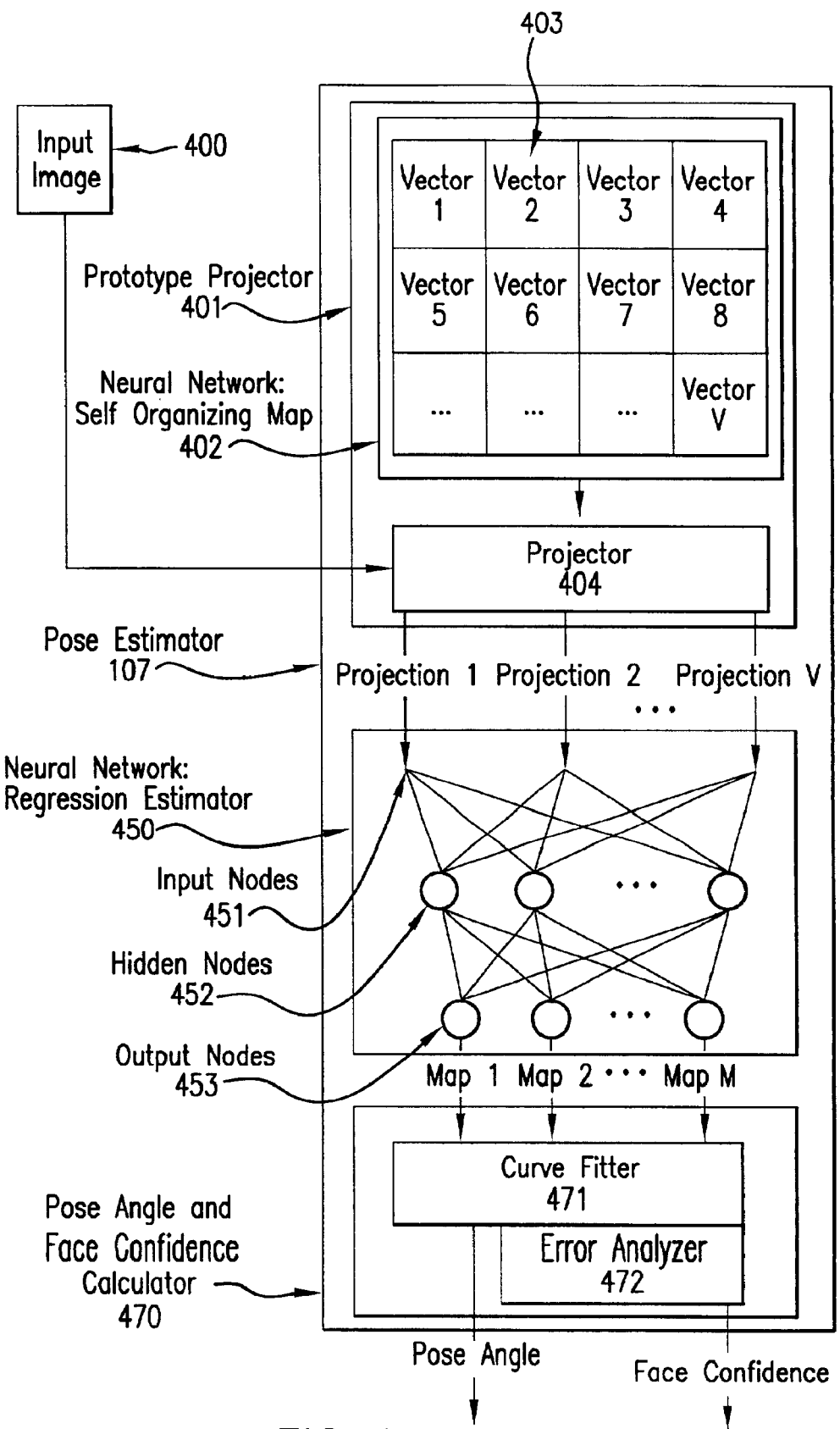
FIG. 4 shows a preferred embodiment of a pose estimator.

A preferred embodiment for implementing pose estimator 107 is shown in FIG. 4. As shown in FIG. 4, pose estimator 107 preferably comprises a prototype projector 401, a regression estimator 450, and a pose-angle and face confidence calculator 470.

Prototype projector 401 preferably comprises a SOM neural network 402 ("SOM net 402") and a projector 404. SOM net 402 is preferably a rectangular neuron array comprising a plurality of prototype vectors 403.

Projector 404 is preferably adapted to receive an input image 400 and project it onto SOM net 402 to generate a projection vector comprising a plurality of calculated distances representing distances between the input image and prototype vectors 403. The purpose of this projection is to reduce the dimensionality from the input image size to the number of neurons in SOM net 402 array, as described below.

Pose estimator 107 further preferably comprises a regression estimator 450 that associates an input projection vector with a unique output pattern representing the pose angle of input image 400. In a preferred embodiment, regression estimator 450 is implemented as a multi-layer perceptron neural network. The neural network preferably comprises 14 input nodes 451, 9 hidden nodes 452, and 7 output nodes 453.

The number of prototype vectors 403 in SOM net 402 is preferably greater than the number of output neurons in regression estimator 450. In a preferred embodiment, SOM net 402 comprises 14 prototype vectors 403.

Each output neuron 453 is preferably tuned to a particular pose angle. In a preferred embodiment, neuron 1 corresponds to $\alpha_1 = -90°$; neuron 2 corresponds to $\alpha_2 = -45°$, neuron 3 corresponds to $\alpha_3 = -25°$, neuron 4 corresponds to $\alpha_4 = 0°$ (frontal view), neuron 5 corresponds to $\alpha_5 = +25°$, neuron 6 corresponds to $\alpha_6 = +45°$, and neuron 7 corresponds to $\alpha_7 = +90°$.

Each neuron k is preferably trained to produce a maximum output for input face images having a pose angle equal to its tuned angle $\alpha_k$. The neuron output values [Map$_1$, Map$_2$, ... Map$_7$] are preferably correlated and compose a waveform defined by a mapping function $F(\alpha(x)-\alpha_k)$, where $\alpha(x)$ is the input image pose angle.

$F(\alpha(x)-\alpha_k)$ is preferably selected to have high values when $\alpha(x)$ is near $\alpha_k$ and low values when $\alpha(x)$ is far from $\alpha_k$. Consequently, this function is preferably chosen to be an even and monotonically decreasing function of the absolute value of the difference $|\alpha(x)-\alpha_{kk}|$.

In a preferred embodiment, the mapping function may be chosen as:

$$F(\alpha(x)-\alpha_k)=\cos(\alpha(x)-\alpha_k)$$

For this function, if, for example, an input image 400 comprising a face at $\alpha(x)=-30°$ is projected by prototype projector 401 and forwarded to regression estimator 450, output neurons 453 yield the following values:

Map$_1$=cos(−30°−(−90°))=+0.500
Map$_2$=cos(−30°−(−45°))=+0.966
Map$_3$=cos(−30°−(−25°))=+0.996
Map$_4$=cos(−30°−(0°))=+0.866
Map$_5$=cos(−30°−(+25°))=+0.574
Map$_6$=cos(−30°−(+45°))=+0.259
Map$_7$=cos(−30°−(+90°))=−0.500

As noted, pose estimator 107 also preferably comprises a pose-angle calculator 470. In a preferred embodiment, calculator 470 preferably comprises a curve fitter 471 and an error analyzer 472.

Curve fitter 471 is preferably adapted to estimate the pose angle $\alpha(x)$ of an input image 400 from its mapping vector [Map$_1$, Map$_2$, ..., Map$_M$]. In a preferred embodiment, curve fitter 471 implements a minimum square-error curve-fitting algorithm to minimize the following metric:

$$SquareError = \sum_{k=1}^{M} (Map_k - F(\alpha' - \alpha_k))^2$$

Here, $\alpha'$ is the estimated value of pose angle $\alpha(x)$ of input image 400. Curve fitter 471 preferably calculates the estimated pose angle $\alpha'$ that minimizes the square error between the actual output of regression estimator network 450 and the pre-specified waveform given by $F(\alpha(x)-\alpha_k)$.

In a preferred embodiment, when $F(\alpha(x)-\alpha_k)=\cos(\alpha(x)-\alpha_k)$, the optimum $\alpha'$ value that minimizes the square error may be calculated as:

$$\alpha' = \tan^{-1}\left(\frac{\left(\sum_{k=1}^{M} Map_k \sin\alpha_k \sum_{k=1}^{M} \cos^2\alpha_k\right) - \left(\sum_{k=1}^{M} Map_k \cos\alpha_k \sum_{k=1}^{M} \sin\alpha_k \cos\alpha_k\right)}{\left(\sum_{k=1}^{M} Map_k \cos\alpha_k \sum_{k=1}^{M} \sin^2\alpha_k\right) - \left(\sum_{k=1}^{M} Map_k \sin\alpha_k \sum_{k=1}^{M} \sin\alpha_k \cos\alpha_k\right)}\right)$$

Error analyzer 472 is preferably adapted to calculate a face-confidence score that reflects the curve-fitting accuracy, i.e., how close the actual output vector [Map$_1$, Map$_2$, ..., Map$_M$] is to the estimated $F(\alpha'-\alpha_k)$. In a preferred embodiment, the face-confidence output may be calculated as:

Face Confidence=100×(1−$\sqrt{SquareError}$/M)

Figure 5:
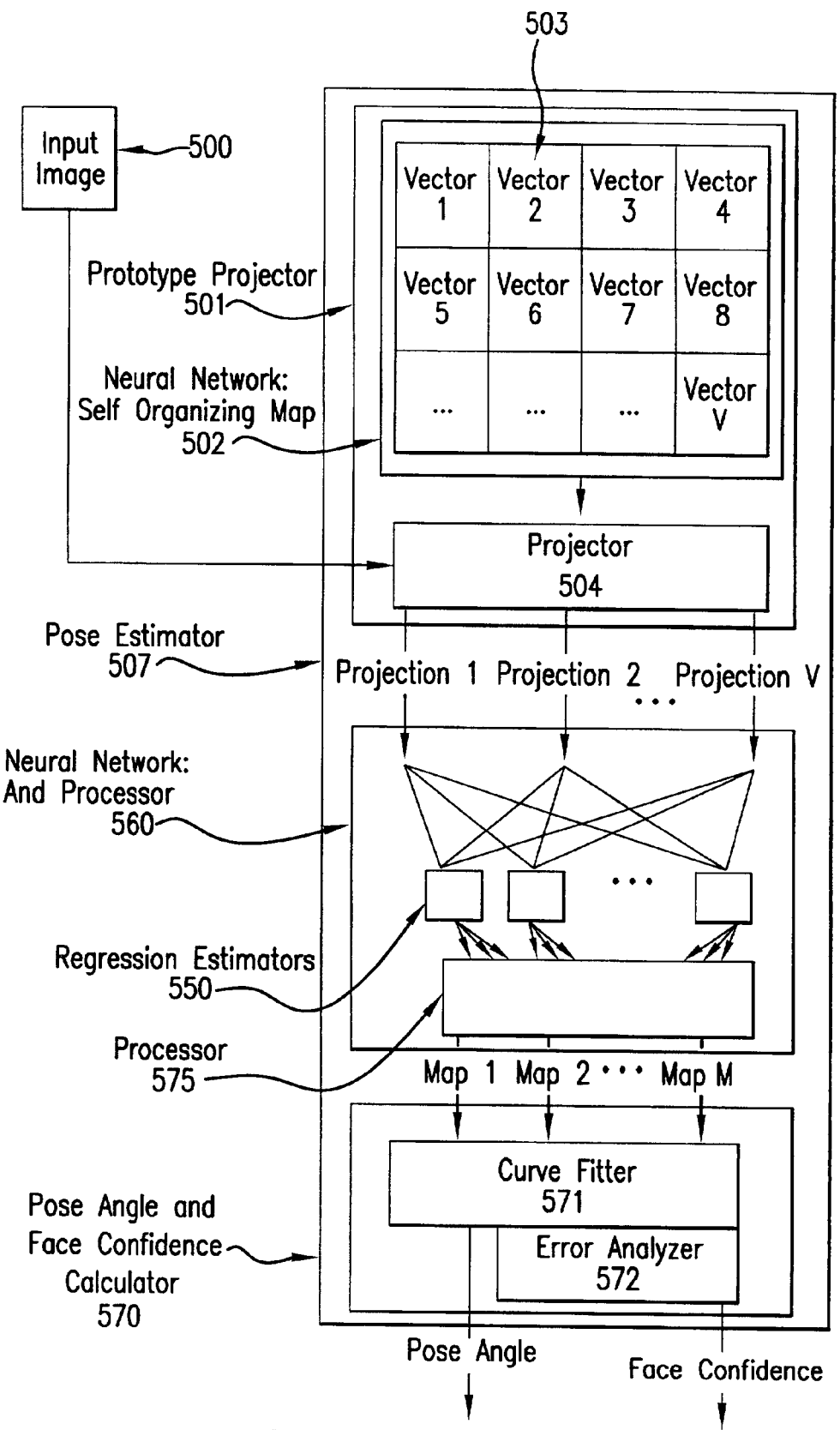
FIG. 5 shows an alternate preferred embodiment of a pose estimator.

FIG. 5 shows an alternative preferred embodiment of a pose estimator 507 suitable for estimating the pose angle of an object in an input image. As will be recognized, many components of pose estimator 507 correspond to components in pose estimator 107 described above, and like components in the two systems are identified by corresponding reference numerals that share the same last two digits.

Pose estimator 507 differs from pose estimator 107 in that it comprises a plurality of regression estimators 550 and a processor 575. Processor 575 is preferably adapted to combine the output of regression estimators 550 to produce a single mapping vector for input to calculator 570, as described below.

In a preferred embodiment, processor 575 may simply average the output of regression estimators 550 to produce the mapping vector. This simple algorithm requires minimal processing and thus, in many cases, may be implemented without affecting the ability of pose estimator 507 to operate in real time.

Alternatively, if sufficient processing capability is available or if real-time operation is not a concern, processor 575 may implement a more sophisticated algorithm to determine the mapping vector. For example, processor 575 may first calculate the average output of all the regression estimators 550 and the standard deviation from that average. A second average may then be calculated to produce the mapping vector that excludes the contribution of any regression estimator whose output is more than one standard deviation from the original average.

To avoid confusion, the following description concerning operation of the present system and method speaks primarily in terms of the preferred embodiment of FIG. 4 and a single regression estimator 450. It will be recognized, however, that the principles described below concerning the training and running of regression estimator 450 may also be applied to the plurality of regression estimators 550 in the preferred embodiment of FIG. 5.

II. System Operation

In a preferred embodiment, operation of the present system is divided into two phases: training and run-time. During training, neural networks 402, 450 are each trained by is respective network trainers 106 using at least one relatively large set of training images, as described in more detail below. During run-time, the trained neural networks process input images and provide output to calculator 470 which determines the pose angles of subjects in the images. In the following description, a preferred embodiment for training each neural network 402, 450 is first described, and a preferred embodiment for run-time operation of system 100 is then described.

A. Training of the SOM Net and Regression Estimator(s)

In a preferred embodiment, training is conducted using several thousand grayscale training images containing human faces. The training set preferably includes images of 1,500 subjects of various races and genders, in different poses, under different lighting conditions, with different facial accessories (e.g., eyeglasses), forming a set of 30,000 training images.

As noted, for purposes of this description, it is assumed that pose estimator 107 is adapted to calculate only yaw pose angle. Accordingly, in this preferred embodiment, the faces in the training set preferably vary only with respect to yaw angle, and exhibit 0° pitch and roll angles.

Once network trainers 106 complete training of SOM net 402 and regression estimator 450, the training images may be discarded. Only the weights of the neural networks need to be stored. In this preferred embodiment, only 5,600 bytes for SOM net 402 and 820 bytes for regression estimator 450 are required to store the neural network weights. Therefore, the total run-time storage requirement of pose estimator 107 is less than 7 Kb.

In a preferred embodiment, before training begins, the training images are cropped to remove pixels outside of the face area. The cropped faces are then preferably rescaled to a canonical size, such as 20 pixels by 20 pixels.

In a preferred embodiment, the same set of training images may be used to train both neural networks 402, 450. As noted below, however, regression estimator 450 is preferably trained in a supervised mode and accordingly, in this preferred embodiment, the pose angle of each training image in the set must be known.

Alternatively, distinct sets of training images may be used to train SOM net 402 and regression estimator 450, respectively. In that case, the pose angles of the subjects in the first set of training images need not be known since SOM net 402 is preferably trained in an unsupervised mode, as described below.

1. Training of SOM Net

In a preferred embodiment, SOM net 402 is trained using a conventional shrinking Gaussian neighborhood function. To train SOM net 402, the canonical training images are presented to the network in an unsupervised mode; i.e., the SOM neurons are not forced to learn an associated output corresponding to a particular input. Rather, SOM net 402 organizes its neuron weight vectors 403 such that those neurons that are topographically close in the array, up to a certain geometric distance, activate each other to learn something from the same input image. This results in local relaxation of the weight vectors of neurons in this neighborhood, which in continued learning leads to global ordering.

Thus, the SOM training produces a similarity graph of input data. It converts the nonlinear statistical relationships between high dimensional (in this preferred embodiment, 20*20=400 dimensional) input data into simple geometric relationships of the SOM network's two-dimensional grid of neurons 403. Therefore, SOM net 402 compresses information while preserving the most important topological metric relationships of the primary data elements. Further information concerning the design and operation of SOM neural networks is disclosed in T. Kohonen, "Self-Organizing Maps," ISBN 3-540-62017-6, Springer-Verlag 2nd edition, 1997, which is hereby incorporated by reference.

As a result of training, each neuron in the SOM array has a weight vector 403 that represents a plurality of training images. In a preferred embodiment, each weight vector 403 has the same dimensionality as the canonical training images and can be regarded as a prototype for those training images that contributed most to the weight-vector formation during the training process.

2. Training of Regression Estimator

Regression estimator 450 is preferably trained in a supervised mode using an error back-propagation technique in which both the input and the desired output are presented to the network. In a preferred embodiment, training of regression estimator 450 may be conducted as follows:

1. Apply a canonical training image to prototype projector 401 after SOM net 402 has been fully trained as described above.

2. Allow prototype projector 401 to calculate a projection vector for the training image [Projection$_1$, Projection$_2$, Projection$_3$, . . . , Projection$_V$], where V is the number of SOM network prototype vectors 403.

3. Calculate the desired output of output nodes 453 [Map$_1$, Map$_2$, . . . , Map$_M$], where M is the number of output nodes 453. The desired-output calculation is preferably performed using the mapping function $F(\alpha(x)-\alpha_k)$, where $\alpha(x)$ is the known pose angle of the input training image and $\alpha_k$ is the tuned angle associated with output neuron k.

4. Present the projection vector [Projection$_1$, Projection$_2$, Projection$_3$, . . . , Projection$_V$] to regression estimator input nodes 451 and the corresponding mapping vector [Map$_1$, Map$_2$, . . . , Map$_M$] to regression estimator output nodes 453.

5. Update the weights of regression estimator network 450 using an error back-propagation technique.

6. Repeat steps 1–5 for additional training images until the mean squared error between the actual output and desired output of regression estimator 450 is acceptable. An error of approximately 2–3% may be considered acceptable for typical applications requiring pose-angle estimation of a human head.

B. Run-time Operation

Figure 6:
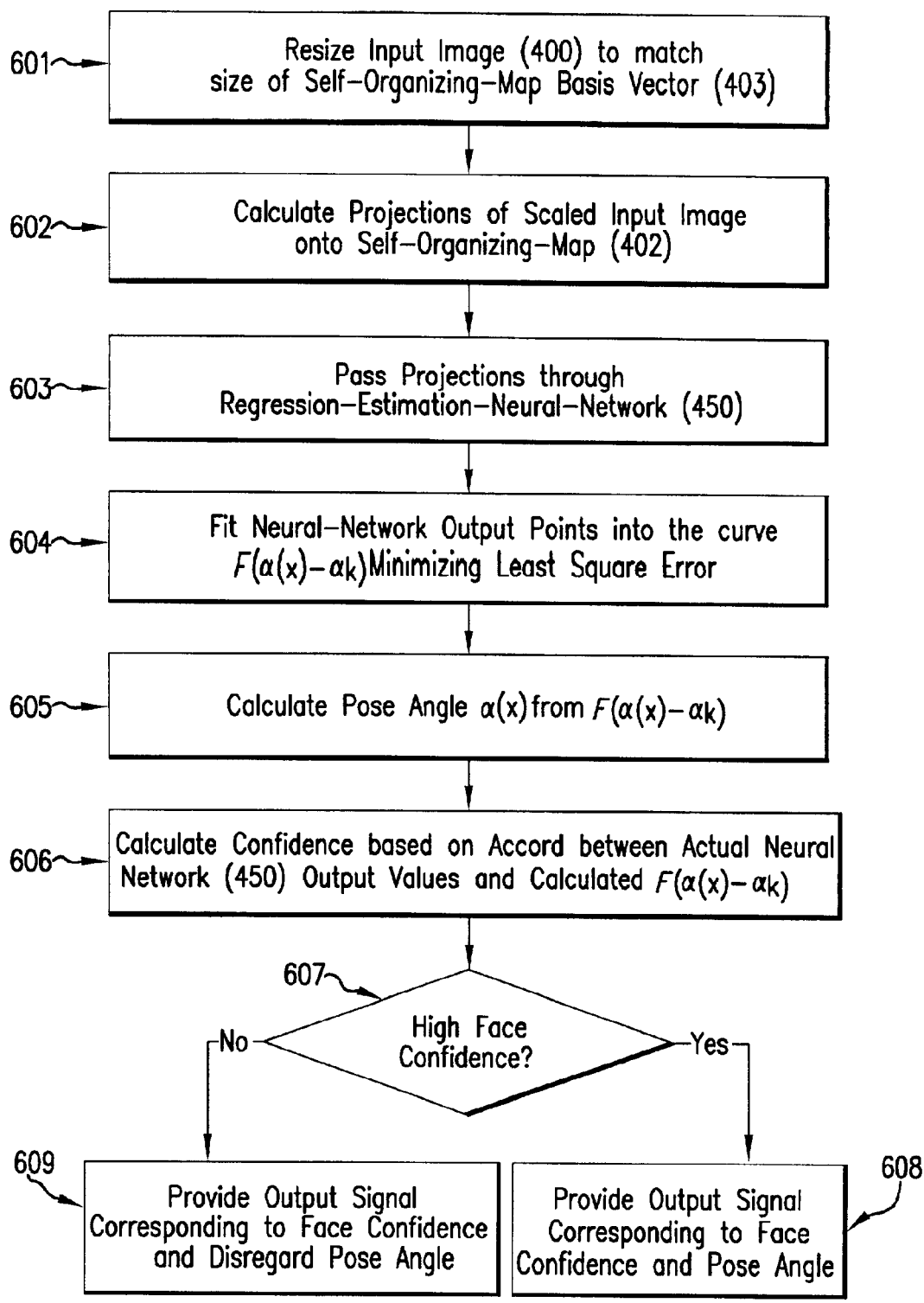
FIG. 6 is a flow diagram depicting a preferred embodiment for estimating the pose angle of a human face.

Once neural networks 402, 450 have been trained, the system is ready for run-time operation. Referring now to FIG. 6, a preferred embodiment of run-time operation is described.

As shown in FIG. 6, in step 601, an image 400 with an unknown pose angle is provided to prototype projector 401. In a preferred embodiment, image 400 is a cropped image that includes only a face or suspected face. In step 601, projector 404 scales input image 400 to match its dimensions to SOM prototype vectors 403. In a preferred embodiment, these dimensions may be 20 pixels by 20 pixels.

In step 602, prototype projector 401 projects the input image onto the SOM network grid of prototype vectors 403. In a preferred embodiment, projector 404 performs this step by calculating the Euclidean distance between the image and prototype vectors 403. Projector 404 then outputs the set of calculated distances as a projection vector [Projection$_1$, Projection$_2$, Projection$_3$, . . . Projection$_v$], where V is the number of SOM network prototype vectors 403. The projection operation reduces the dimensionality from its original dimensionality (e.g., 20 by 20=400) to V. As noted, in a preferred embodiment, V is 14.

In step 603, regression estimator 450 processes the projection vector to calculate an output mapping vector [Map$_1$, Map$_2$, . . . , Map$_M$]. In step 604, curve fitter 471 fits the output mapping vector onto the curve $F(\alpha(x)-\alpha_k)$ by minimizing the least square error. In step 605, curve fitter 471 calculates the estimated pose angle $\alpha(x)$. In step 606, error analyzer 472 calculates a face confidence value.

In step 607, pose estimator 107 checks the output-confidence value. A high output-confidence value implies that the scaled input image represents a canonical face pointing in the direction indicated by the output pose angle. By contrast, a low output-confidence value indicates that the pose-angle output is not reliable. If a high value is found, an output signal is provided in step 608 that corresponds to the calculated confidence and pose angle. If a low value is found, an output signal is provided in step 609 that corresponds to the low confidence value and the pose angle is preferably disregarded.

A low confidence value results when mapping vector [Map$_1$, Map$_2$, . . . , Map$_M$] does not fit uniformly in the target waveform $F(\alpha'-\alpha_k)$. This is typically caused by one of two situations:

1. Input image 400 does not include a face.
2. Input image 400 includes a face but differs significantly from the images used to train SOM net 402 and regression estimator 450. For example, if the training images included only male subjects wearing glasses and exposed to indoor lighting, then the present system might generate inaccurate results when presented with an image that includes a female subject without glasses in direct sunlight.

Increasing the number of training set images while broadening the range of faces and image conditions can minimize or eliminate the second situation. Consequently, when the set of training images is adequate, the cause of a low confidence value will typically be that the input image does not include a face. Therefore, the face confidence output may be used to detect the presence of a face as well as to indicate the reliability of the estimated pose angle.

During run-time operation, pose estimator 107 of the preferred embodiment is able to determine the yaw pose angle of facial images not in the training set at the rate of 75 frames per second using a Pentium III 800 MHZ workstation.

It should be noted that although in the description above it has been assumed that the prototype projector is provided with cropped images that include only the face area, the present system and method may also be employed with ordinary unclipped images by pre-processing such images using suitable processing techniques.

For example, a sliding constant size window with the same dimension as SOM prototype vectors 403 may be used to scan an unclipped input image at multiple scales and shifts, and apply the window content to pose estimator 107 as a canonical input image 400. The output (pose angle and face confidence) may be recorded, and the window location exhibiting the best face confidence may be assumed to contain a facial image.

III. Pose-angle Estimation in Other Dimensions

Although the above discussion has focused on yaw estimation, the present system and method may alternatively be adapted to determine pose angle in another dimension such as pitch and roll by training neural networks 402, 450 with training images that comprise subjects exhibiting a variety of pose angles in the desired dimension. For example, to adapt system 100 for pitch estimation, neural networks 402, 450 are preferably trained with training images that comprise faces that vary only with respect to pitch angle; and exhibit 0° yaw and roll angles.

In addition, if desired, an integrated system for calculating the head pose of a subject in all three dimensions may be implemented. A preferred embodiment of such a three-dimensional pose-angle estimator is illustrated in FIG. 7.

Figure 7:
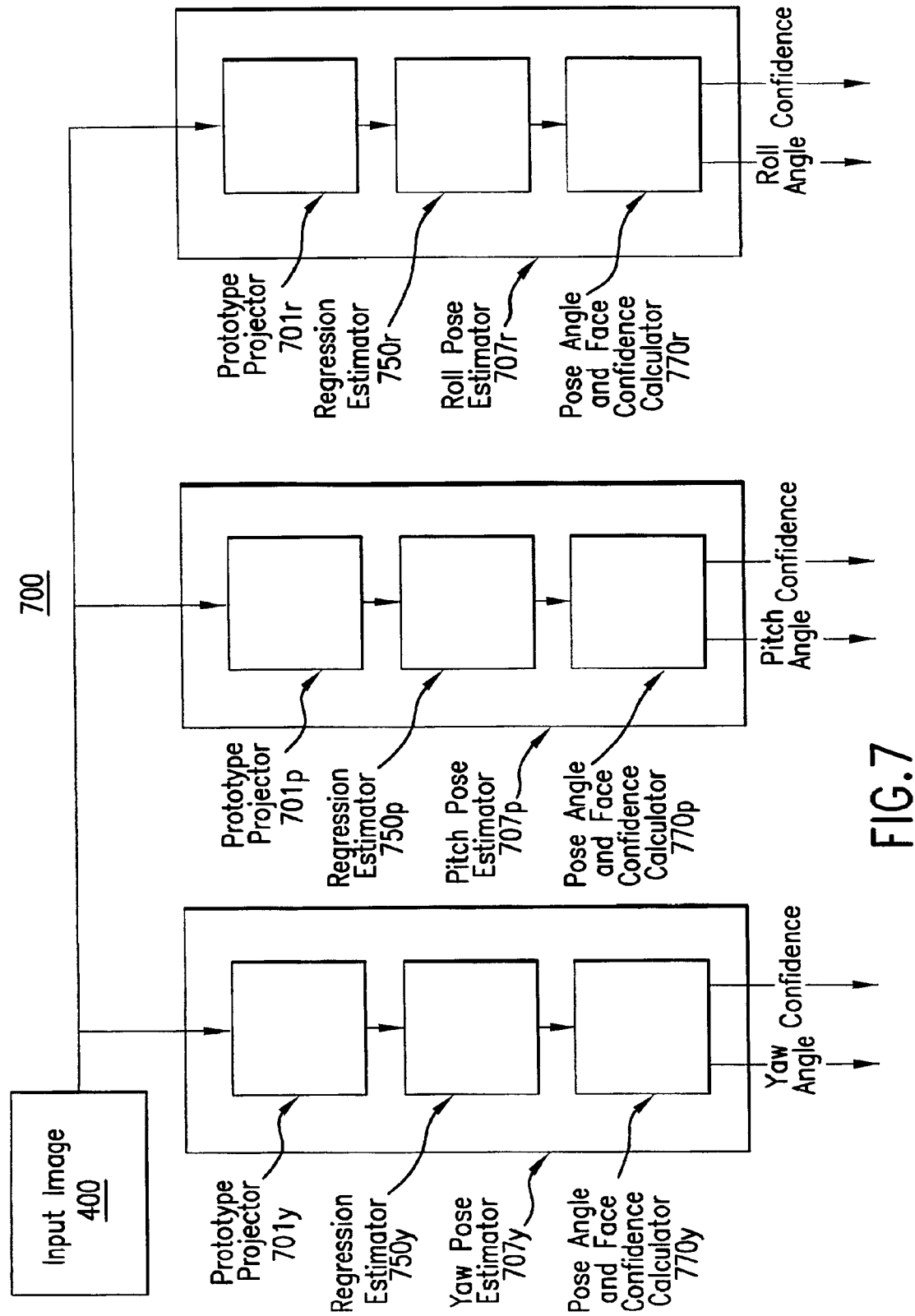
FIG. 7 shows a preferred embodiment of a system for estimating pose angle in three dimensions; and, FIG. 8 shows an alternative preferred embodiment of a system for estimating pose angle in three dimensions.

As shown in FIG. 7, a system 700 for pose-angle estimation in three dimensions preferably comprises three pose estimators 707, one for each degree of freedom: yaw, pitch, and roll. As above, each pose estimator 707 preferably comprises two neural networks: a SOM network included in a prototype projector 701, and a regression estimator network 750. The output of respective regression estimators 750 is preferably provided to respective calculators 770, in accordance with the description above.

In a preferred embodiment, the neural networks of system 700 are each trained using a separate set of images that vary in only one degree of freedom. Once estimators 707 have been trained, an input image 400 comprising a subject with a head pose at any yaw, pitch, and roll may be presented to each estimator. The output of each estimator 707 preferably comprises a respective pose angle and confidence value for its dimension.

Figure 8:
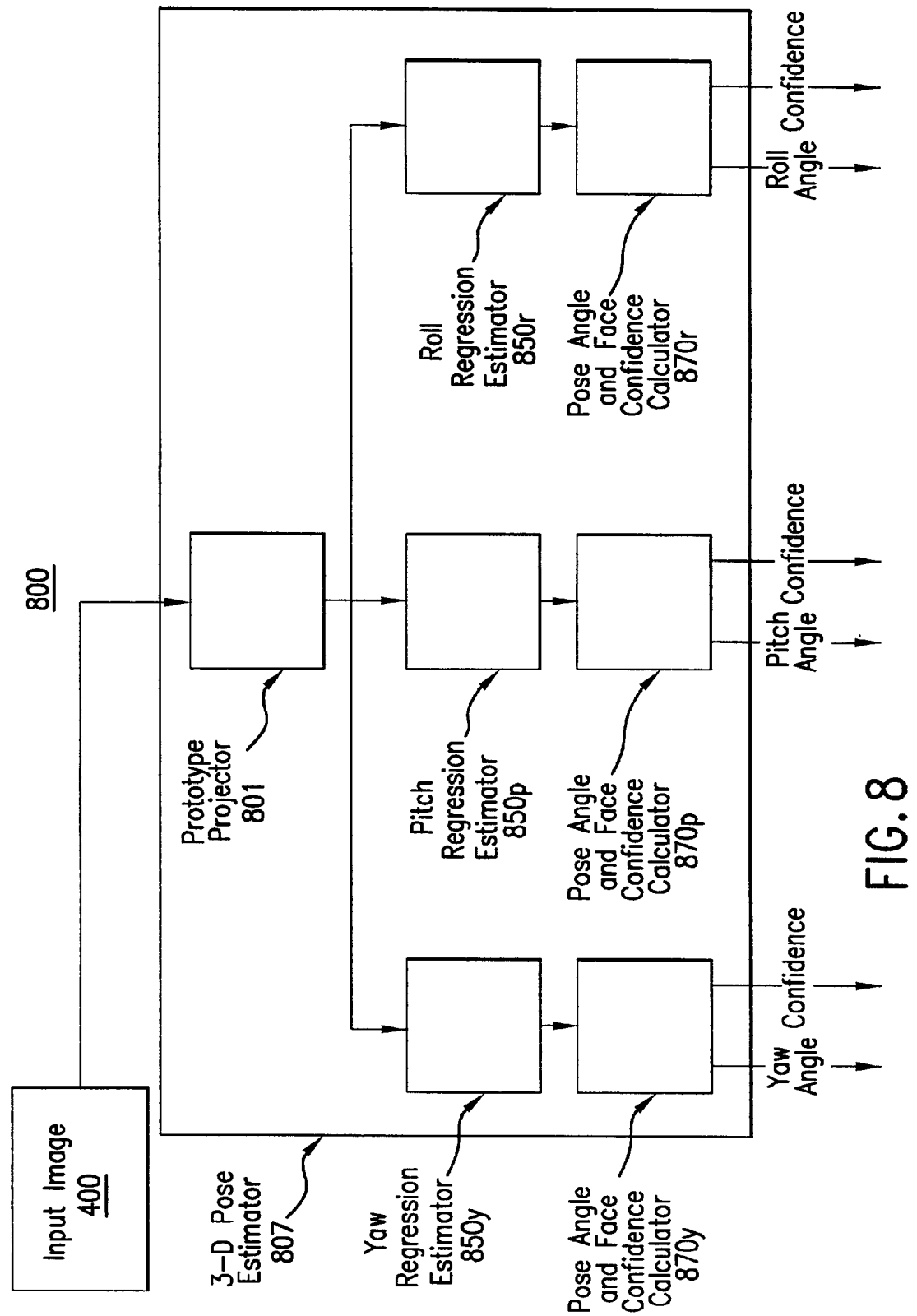

An alternative embodiment of a three-dimensional estimator is shown in FIG. 8. As shown in FIG. 8, a system 800 for pose-angle estimation in three dimensions preferably comprises a shared prototype projector 801, three regression estimators 850 for yaw, pitch, and roll, and three calculators 870. The output of prototype projector 801 is preferably presented to each regression estimator 850.

In this preferred embodiment, a single training set maybe used that includes subjects whose pose varies in all three degrees of freedom. When training the regression estimators 850, the desired outputs for each estimator are calculated for each training image using a respective known pose angle in each of the three dimensions. For example, if a training image has a yaw angle of −50°, a pitch angle of −10°, and a roll angle of 0°, the pose angle used for error back-propagation training for yaw regression estimator 850y is preferably set to −50°. Likewise, the pose angles for pitch and roll regression estimators 850p, 850r are preferably set to −10° and 0° , respectively.

It should be recognized that although the discussion above focuses on pose-angle estimation of human faces, the system and method of the present invention may be applied to determine the pose angle of other objects. For example, with proper training images, the system and method described above may be used to estimate the angular orientation of cars, ships, airplanes, and other objects, both animate and inanimate.

It should also be recognized that the present system and method advantageously do not depend on color or motion cues for determining pose angle.

While the invention has been described in conjunction with specific embodiments, it is evident that numerous alternatives, modifications, and variations will be apparent to those persons skilled in the art in light of the foregoing description.

What is claimed is:

1. A system for determining a pose angle of an object in an input image in at least one dimension, comprising:
   a first neural network trained in an unsupervised mode using a first plurality of training images to develop a plurality of weight vectors, each weight vector representing a plurality of the training images;
   a projector adapted to receive an input image and generate a projection vector comprising a plurality of calculated distances representing distances between the input image and the weight vectors;
   a second neural network trained in a supervised mode with a second plurality of training images, the second plurality of training images comprising objects at known pose angles, the second neural network comprising a plurality of neurons, each neuron tuned to a particular pose angle and adapted to receive the projection vector and output a value in accordance with a function that is even and monotonically decreasing for changes in the pose angle of the objects from the pose angle to which each neuron is tuned;
   a curve fitter adapted to receive the values output by the neurons and estimate the pose angle of the object in at least one dimension; and
   an error calculator that generates a value representative of the error between the values output by the neurons and the calculated values for the function using the estimated pose angle.

2. The system of claim 1, wherein the object is a head.

3. The system of claim 1, wherein the function is: $\cos(\alpha(x)-\alpha_k)$, where $\alpha_k$ is the angle to which a neuron is tuned, and where $\alpha(x)$ is the estimated pose angle.

4. The system of claim 1, wherein the curve fitter implements a minimum square-error curve-fitting algorithm.

5. The system of claim 1, further comprising an imaging sensor adapted to capture an image in a field of view of the sensor.

6. The system of claim 5, wherein the imaging sensor comprises a video camera.

7. The system of claim 5, wherein the imaging sensor comprises a digital camera.

8. The system of claim 1, wherein the input image is derived form a live subject.

9. The system of claim 1, wherein the input image is derived from a photograph.

10. The system of claim 1, wherein the input image is derived from a printed image.

11. The system of claim 1, wherein the input image is derived from an artists' rendering.

12. The system of claim 1, wherein at least some of the first plurality of training images are the same as at least some of the second plurality of training images.

13. The system of claim 12, wherein the first plurality of training images and the second plurality of training images comprise the same training images.

14. The system of claim 1, wherein the number of weight vectors is greater than the number of output nodes of the second neural network.

15. The system of claim 14, wherein the number of weight vectors is approximately twice the number of output nodes of the second neural network.

16. The system of claim 1, wherein the input image is generated by cropping a portion of an image that contains the object.

17. The system of claim 1, wherein the projector is adapted to rescale the input image to canonical dimensions.

18. The system of claim 17, wherein the canonical dimensions are 20 pixels by 20 pixels.

19. The system of claim 1, wherein the at least one dimension is yaw.

20. The system of claim 1, wherein the at least one dimension is pitch.

21. The system of claim 1, wherein the at least one dimension is roll.

22. The system of claim 1, wherein the system is adapted to estimate the yaw, pitch, and roll pose angles.

23. A method for determining a pose angle of an object in an input image in at least one dimension, comprising:
   training a first neural network in an unsupervised mode using a first plurality of training images to develop a plurality of weight vectors, each weight vector representing a plurality of the training images;
   projecting the input image onto the first neural network to generate a projection vector comprising a plurality of calculated distances representing distances between the input image and the weight vectors;
   training a second neural network in a supervised mode with a second plurality of training images, the second plurality of training images comprising objects at known pose angles, the second neural network comprising a plurality of neurons, each neuron tuned to a particular pose angle;
   processing the projection vector in the second neural network in accordance with a function that is even and monotonically decreasing for changes in the pose angle of the object from the pose angle to which each neuron is tuned to generate a plurality of output values;
   fitting the output values to a curve to estimate the pose angle of the object in at least one dimension; and
   calculating a value representative of the error between the output values and the calculated values for the function using the estimated pose angle.

24. The method of claim 23, wherein the object is a head.

25. The method of claim 24, wherein the head includes a face discernable in the image.

26. The method of claim 23, wherein the function is: $\cos(\alpha(x)-\alpha_k)$, where $\alpha_k$ is the angle to which a neuron is tuned, and where $\alpha(x)$ is the estimated pose angle.

27. The method of claim 23, wherein the curve fitter implements a minimum square-error curve-fitting algorithm.

28. The method of claim 23, further comprising an imaging sensor adapted to capture an image in a field of view of the sensor.

29. The method of claim 28, wherein the imaging sensor comprises a video camera.

30. The method of claim 28, wherein the imaging sensor comprises a digital camera.

31. The method of claim 23, wherein the input image is derived from a live subject.

32. The method of claim 23, wherein the input image is derived from a photograph.

33. The method of claim 23, wherein the input image is derived from a printed image.

34. The method of claim 23, wherein the input image is derived from an artists' rendering.

35. The method of claim 23, wherein at least some of the first plurality of training images are the same as at least some of the second plurality of training images.

36. The method of claim 35, wherein the first plurality of training images and the second plurality of training images comprise the same training images.

37. The method of claim 23, wherein the number of weight vectors is greater than the number of output nodes of the second neural network.

38. The method of claim 37, wherein the number of weight vectors is approximately twice the number of output nodes of the second neural network.

39. The method of claim 23, wherein the input image is generated by cropping a portion of an image that contains the object.

40. The method of claim 23, wherein the projector is adapted to rescale the input image to canonical dimensions.

41. The method of claim 40, wherein the canonical dimensions are 20 pixels by 20 pixels.

42. The method of claim 23, wherein the at least one dimension is yaw.

43. The method of claim 23, wherein the at least one dimension is pitch.

44. The method of claim 23, wherein the at least one dimension is roll.

45. The method of claim 23, wherein the system is adapted to estimate the yaw, pitch, and roll pose angles.

46. A system for determining a pose angle of an object in an input image in at least one dimension, comprising:
- a first neural network using a first plurality of training images to develop a plurality of weight vectors, each weight vector representing a plurality of the training images;
- a projector adapted to receive an input image and generate a projection vector comprising a plurality of calculated distances representing distances between the input image and the weight vectors;
- a second neural network trained in a supervised mode with a second plurality of training images, the second plurality of training images comprising objects at known pose angles, the second neural network comprising a plurality of neurons, each neuron tuned to a particular pose angle and adapted to receive the projection vector and output a value in accordance with a function that is even and monotonically decreasing for changes in the pose angle of the object from the pose angle to which each neuron is tuned;
- a curve fitter adapted to receive the values output by the neurons and estimate the pose angle of the object in at least one dimension; and
- an error calculator that generates a value representative of the error between the values output by the neurons and the calculated values for the function using the estimated pose angle.

47. The system of claim 46, wherein the first neural network is trained in a supervised mode or an unsupervised mode.

48. A method for determining a pose angle of an object in an input image in at least one dimension, comprising:
- training a first neural network using a first plurality of training images to develop a plurality of weight vectors, each weight vector representing a plurality of the training images;
- projecting the input image onto the first neural network to generate a projection vector comprising a plurality of calculated distances representing distances between the input image and the weight vectors;
- training a second neural network in a supervised mode with a second plurality of training images, the second plurality of training images comprising objects at known pose angles, the second neural network comprising a plurality of neurons, each neuron tuned to a particular pose angle;
- processing the projection vector in the second neural network in accordance with a function that is even and monotonically decreasing for changes in the pose angle of the object from the pose angle to which each neuron is tuned to generate a plurality of output values; fitting the output values to a curve to estimate the pose angle of the object in at least one dimension; and
- calculating a value representative of the error between the output values and the calculated values for the function using the estimated pose angle.

49. The method of claim 48, wherein the first neural network is trained in a supervised mode or an unsupervised mode.

* * * * *